United States Patent
Muchenberger et al.

(10) Patent No.: US 6,236,436 B1
(45) Date of Patent: May 22, 2001

(54) WIDTH AND PHASE CONTROL OF BLANKING PULSE

(75) Inventors: Manfred Muchenberger, Zurich; Peter Eduard Haferl, Adliswil, both of (CH)

(73) Assignee: Thomson Licensing, S.A. (FR)

( * ) Notice: Subject to any disclaimer, the term of this patent is extended or adjusted under 35 U.S.C. 154(b) by 0 days.

(21) Appl. No.: 09/297,402

(22) PCT Filed: Nov. 13, 1997

(86) PCT No.: PCT/IB97/01429

§ 371 Date: Apr. 29, 1999

§ 102(e) Date: Apr. 29, 1999

(87) PCT Pub. No.: WO98/21888

PCT Pub. Date: May 22, 1998

(30) Foreign Application Priority Data

Nov. 13, 1996 (GB) .................................... 9623629

(51) Int. Cl.[7] ...................................................... H04L 7/00

(52) U.S. Cl. ........................................... 348/540; 348/521

(58) Field of Search ................................ 348/521, 540, 348/536, 511, 194, 735; 315/364, 370, 379, 387; 331/20

(56) References Cited

U.S. PATENT DOCUMENTS

| 4,063,133 | * | 12/1977 | Nero et al. ............................ 315/370 |
| 4,263,615 | * | 4/1981 | Steinmetz et al. .................... 358/148 |
| 4,351,002 | * | 9/1982 | Decraemer et al. .................. 358/158 |
| 4,549,202 |   | 10/1985 | Hittiger ................................. 358/17 |
| 4,558,355 |   | 12/1985 | Hettiger ................................ 358/74 |
| 4,652,920 |   | 3/1987 | Dietz ..................................... 358/165 |
| 4,767,971 |   | 8/1988 | Onozowa et al. .................... 315/384 |
| 5,300,865 |   | 4/1994 | Koblitz et al. ........................ 315/384 |
| 5,337,023 |   | 8/1994 | Hobrecht .............................. 331/20 |
| 5,621,485 | * | 4/1997 | Terao et al. ........................... 348/735 |

FOREIGN PATENT DOCUMENTS 0609514   8/1994 (EP) .

* cited by examiner

Primary Examiner—Victor R. Kostak
(74) Attorney, Agent, or Firm—Joseph S. Tripoli; Joseph J. Laks; Joseph J. Kolodka

(57) ABSTRACT

An apparatus comprises a source of a first signal synchronized to deflection, the first signal including a first portion representative of a retrace interval, means coupled to a first video signal and responsive to a second signal representative of the retrace interval for generating a second video signal having a blanking interval, and, means responsive to a third signal representative of the blanking interval and to the first signal for generating the second signal so as to control the phase of the blanking interval relative to the retrace interval.

9 Claims, 3 Drawing Sheets

WIDTH AND PHASE CONTROL OF BLANKING PULSE

BACKGROUND OF THE INVENTION

This invention relates to the field of video synchronization systems, such as to the generation of horizontal blanking signals.

In television, blanking pulses may be used to make invisible the scanning retrace lines. The blanking time may be slightly longer than the typical values of retrace time. As a result, a part of the trace portion is blanked out at the start and end of every scanning line, creating a black bar at both the left and right edges of the raster. The blanking bars are not apparent to the viewer because they appear in an overscan area on the left and right sides of the raster. Thus, the blanking bars at the sides generally have no effect on the picture other than to slightly decrease its width at the very edge. However, problems occur when the blanking pulse is not centered during retrace. When blanking is not centered, the viewer may see a condition referred to as foldover on the right edge of the raster or a blanked video in the form of a black bar on the left edge of the raster, unless the blanking is done in the overscan region. A large overscan region will have the effect of shortening the active video region.

Typically, blanking pulses are combined with video in an open loop system, for example in the integrated circuit by Philips, TDA9080. A blanking generator receives R, G, B video signals by a conventional video processor and also receives blanking information in the form of a sandcastle signal from a sandcastle generator, such as in the Philips TDA9064. The combined video signal, with blanking information included, is then supplied to the CRT cathodes. All this is done in an open loop and can introduce delays up to 2 μs relative to the retrace pulse. Undesirably, due to this excessive delay, the use of a large degree of overscan may be therefore required.

SUMMARY OF THE INVENTION

In accordance with an inventive arrangement, an apparatus comprises a source of a first signal synchronized to deflection, the first signal including a first portion representative of a retrace interval, means coupled to a first video signal and responsive to a second signal representative of the retrace interval for generating a second video signal having a blanking interval, and, means responsive to a third signal representative of a video blanking interval and to the first signal for generating the second signal so as to control the phase of the blanking interval relative to the retrace interval.

DETAILED DESCRIPTION

Figure 1:
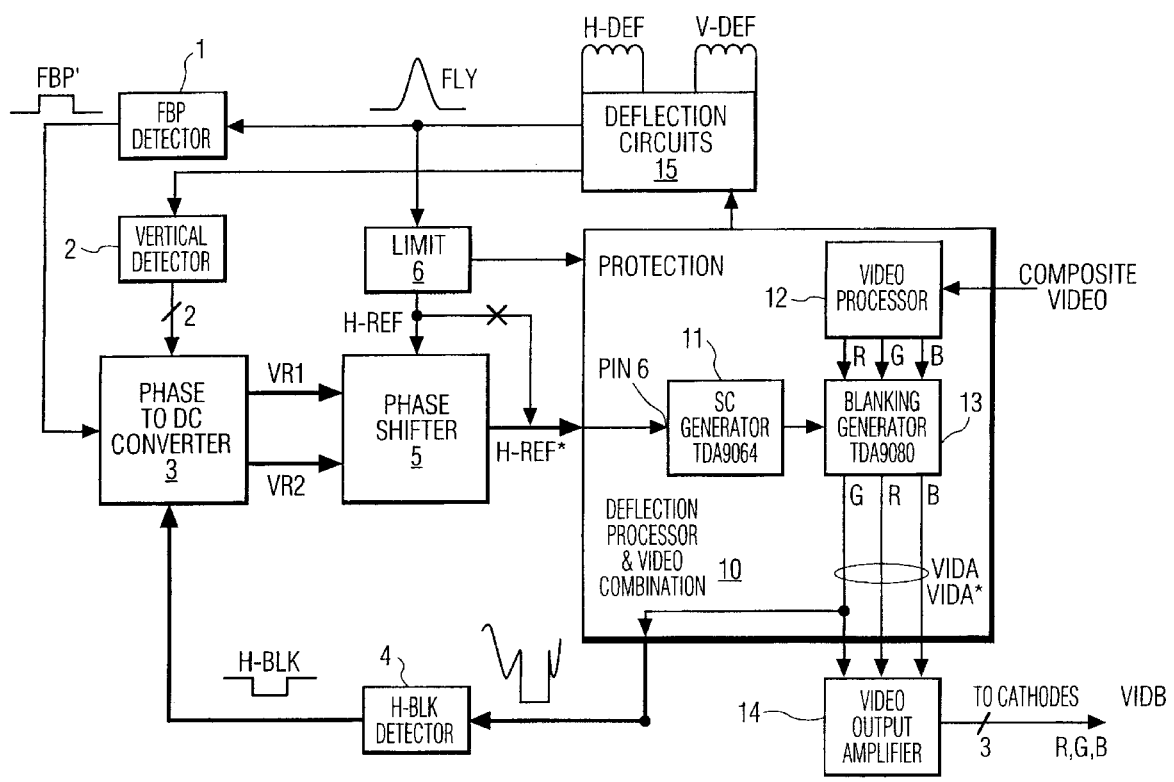
FIG. 1 is a block diagram of a horizontal blanking generator according to an inventive arrangement.
Figure 2:
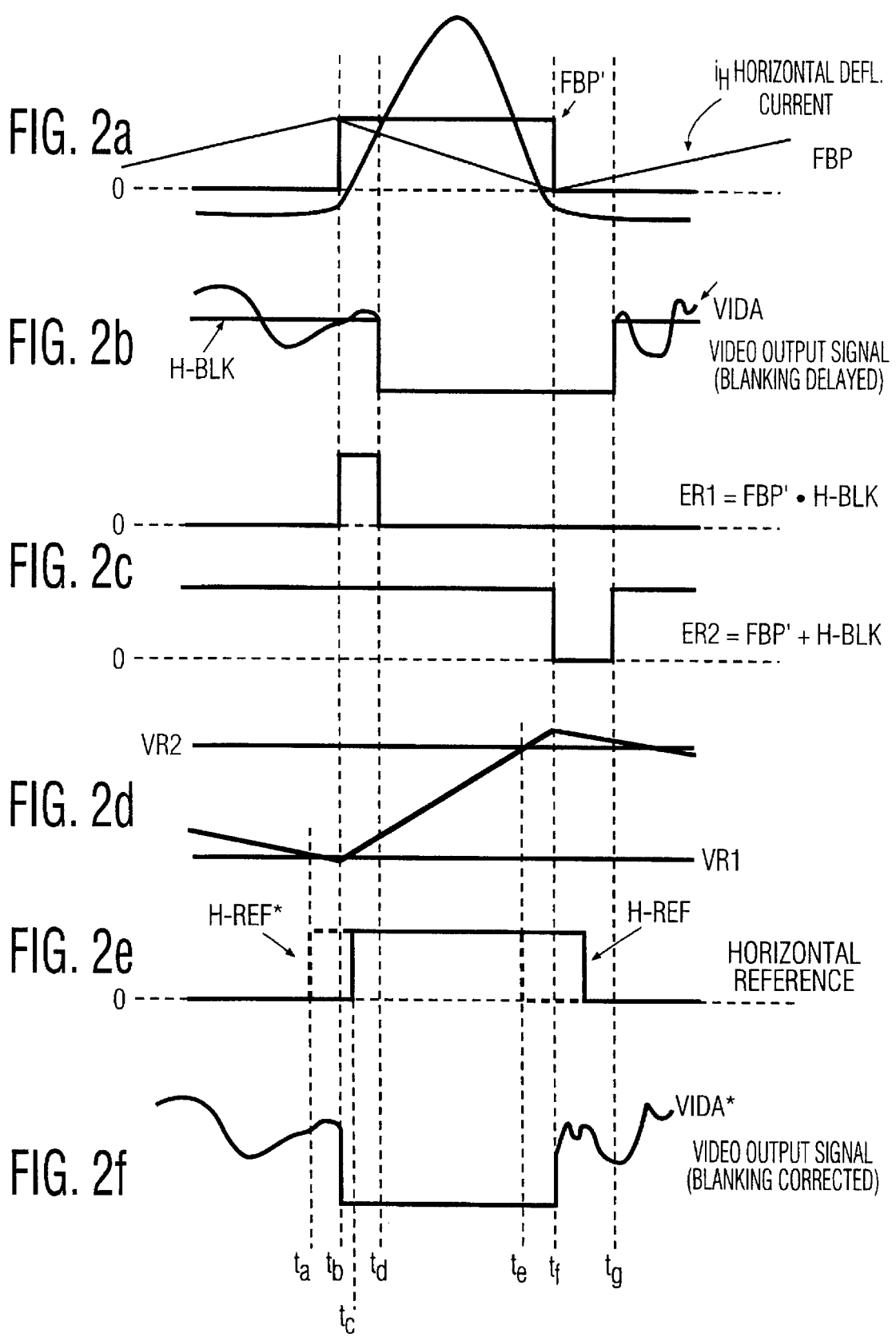
FIGS. 2 (a)–(f) are timing diagrams useful for explaining the operation of the arrangement depicted in FIG. 1.

FIGS. 1 and 2 depict the block diagram and the corresponding waveforms. The flyback pulse FLY, derived from the deflection circuit 15, is detected by the FBP detector I as a reference pulse FBP', providing timing information of the retrace portion of the horizontal deflection current, as shown in FIG. 2a. The flyback reference pulse FBP' has an interval tb-tf. This pulse serves as a reference input to a Phase to DC converter 3. The horizontal blanking signal H-BLK is derived in the H-BLK detector 4 from the video signal at the input of the video output amplifier, as shown in FIG. 2b. The blanking and video information is combined in video output signal VIDA. As FIG. 2b shows, the blanking is delayed in the video output signal VIDA.

The blanking signal is compared to the flyback reference pulse in the Phase to DC converter 3. As a result of the comparison, two error signals, ER1 and ER2, are generated as shown in FIG. 2c. ER1 represents the leading part (time tb) of the blanking signal and ER2 represents the trailing part (time tf). The widths of ERI (interval tb-td) and ER2 (interval tf-tg) are proportional to the timing error of the respective edges of the blanking signal.

ER1 and ER2 are converted into two DC control signals, VR1 and VR2, as shown in FIG. 2d. These are used in Phase Shifter 5 to shift the horizontal reference (H-REF), derived from the flyback pulse through the limiter 6, for the video combination circuit to achieve coincidence between H-BLK and FBP'. FIG. 2e shown that the blanking is shifted by dashed lines for signal H-REF*. Referring back to FIG. 2b, the output video signal VIDA is delayed relative to the retrace interval. By shifting the horizontal reference pulse responsive to a signal representative of a blanking interval, the initiation of blanking is advanced from time tc to time ta so that the video output signal is centered within the retrace interval, as shown in FIG. 2f. To avoid malfunctions of the loop, VR1 and VR2 are maintained during the vertical interval.

In another embodiment, the phase of the blanking interval may be controlled where the phase shifter 5 is responsive to the control signal VR1 or VR2 representative of the blanking interval in a feedback loop.

Figure 3:
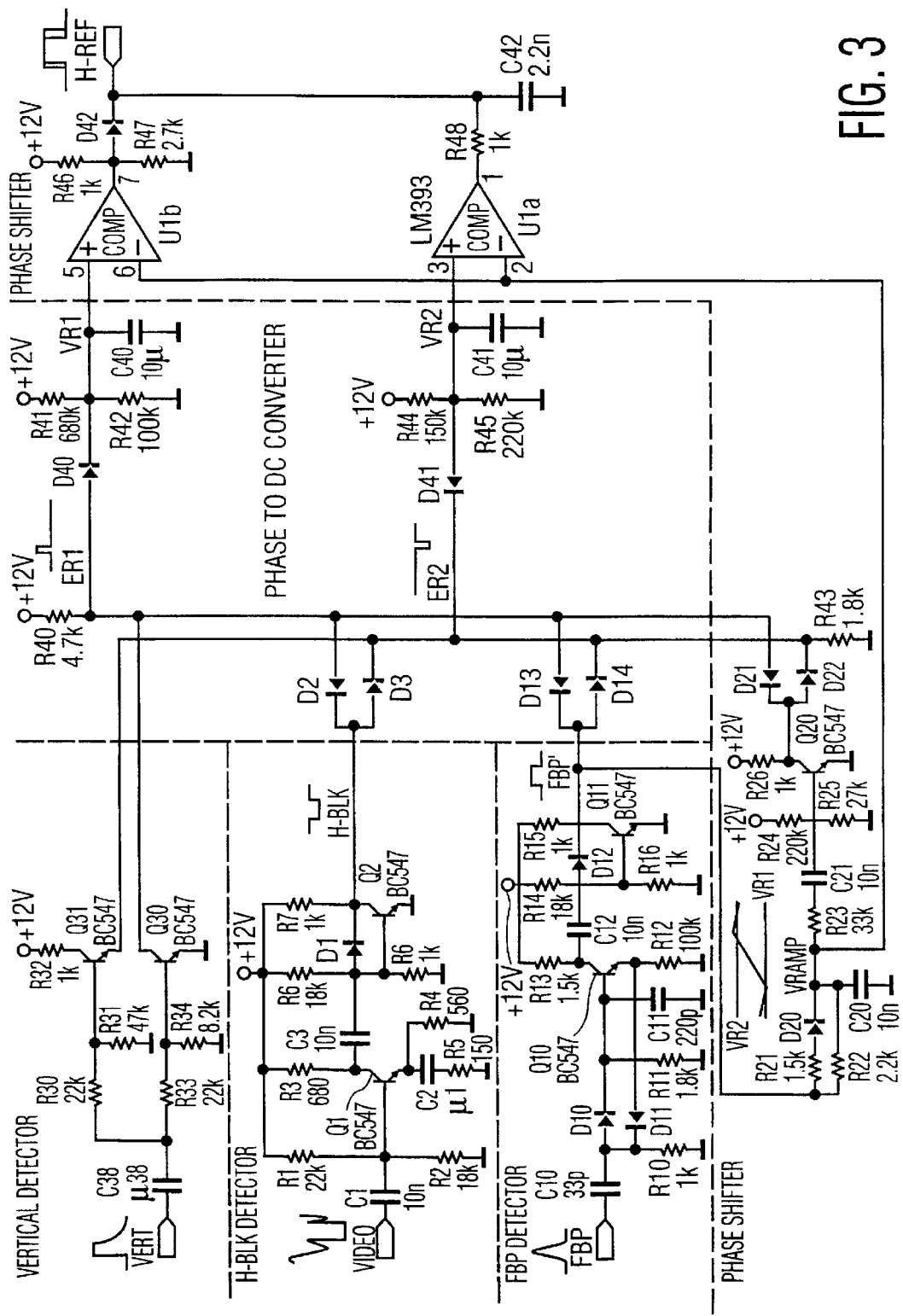
FIG. 3 is a detailed circuit for implementing the horizontal blanking generator of FIG. 1.

The circuit for implementing the horizontal blanking generator is shown in FIG. 3. The flyback pulse FLY is taken directly at the horizontal deflection transistor and applied to the FBP-detector. To obtain a pulse FBP' representative of the horizontal retrace interval, the flyback pulse FLY has to be detected at the beginning of the rising and the end of the falling edge. The flyback pulse is differentiated by C10 and R10. This signal drives Q10 via D10 and D11. C11 inhibits the transistor from turning off during the zero crossing of the differentiated flyback pulse. Q11 improves the shape and inverts the signal.

The H-BLK detector receives the video signal from the input of the video output amplifier. The output is not suitable because the video signal might be disturbed. Qi buffers the signal, C3 blocks its DC component and Q2 clamps it to 0.6V during the horizontal blanking interval and amplifies the horizontal blanking pulse.

In the Phase to DC converter, the coincidence of the positive portions of FBP' and H-BLK generates pulse ER1 in the circuit composed of D2, D13 and R40. In a similar manner, pulse ER2 is obtained by the coincidence of the negative portions of the two signals, by D3, D14 and R43. ER1 and ER2 are converted into the DC signals VR1 and VR2 by D40, C40 and D41, C41, respectively.

In the Phase Shifter, a signal Vramp is generated synchronously with FBP' by charging C20 via R21, R22 and D20 and discharging it via R22. Vramp is compared to ER1 and ER2 in the two comparators U1a and U1b. When Vramp exceeds VR1, the output of U1b goes high and initiates the start of the phase corrected blanking pulse H-REF*. Conversely, this pulse is terminated when the ramp exceeds VR2.

The H-BLK detector cannot distinguish between horizontal and vertical blanking. Therefore, for fault protection circuit, VERT is taken at the vertical deflection coil. During the vertical pulse, D40 and D41 are both reverse biased by Q30 and Q31, respectively.

During the switching on of the TV receiver or during channel change, the horizontal deflection is not synchronized to the video signal. To avoid false error signals, ER1 is inhibited during the trailing part of retrace, and ER2 is inhibited during the leading part of retrace. Therefore, the already existing Vramp is fed via R23 and C21 to transistor Q20. Transistor Q20 pulls down ER1 via D21 during the trailing part of the blanking signal and resistor R26 pulls up ER2 via D22 during the leading part of the blanking signal.

What is claimed is:

1. An apparatus, comprising:

means coupled to a first video signal representative of an input video and responsive to a second signal representative of a retrace interval for generating a second video signal having a first blanking interval and including said input video; and, wherein means responsive to a third signal representative of said first blanking interval of said second video signal and to a first signal synchronized to deflection for generating said second signal so as to control the phase of said first blanking interval relative to said retrace interval.

2. An apparatus according to claim 1, wherein said means for generating said second signal generates said second signal in a feedback loop.

3. An apparatus according to claim 2, wherein said means for generating said second video signal comprises a blanking generator, a sandcastle signal generator and a video processor.

4. An apparatus according to claim 2, wherein said means for generating said second signal comprises a phase to DC converter.

5. An apparatus, comprising:

a source of a signal synchronized to deflection;

means responsive to said synchronized signal for generating a signal representative of a retrace interval;

means for generating a blanking signal representative of the blanking interval of an output video signal; wherein means responsive to said retrace interval representative and said blanking signal for generating a control signal representative of the timing of said blanking interval relative to said retrace interval; and, means responsive to said control signal for adjusting the phase of said blanking interval relative to said retrace interval.

6. An apparatus according to claim 5, wherein said means for adjusting the phase of said blanking interval is included in a feedback loop.

7. An apparatus according to claim 5, wherein said means for generating a blanking signal comprises a blanking generator, a sandcastle signal generator and a video processor.

8. An apparatus according to claim 5, wherein said means for generating a control signal comprises a phase to DC converter.

9. An apparatus, comprising:

means for generating a signal representative of a retrace interval;

means for generating a blanking signal representative of a blanking interval of a video signal; wherein means responsive to said retrace interval representative and said blanking signals for generating an error signal representative of a timing difference between said blanking interval and said retrace interval; and, means responsive to said error signal for adjusting the timing of said blanking interval relative to said retrace interval.

\* \* \* \* \*